(12) United States Patent
Ogasawara et al.

(10) Patent No.: US 10,840,496 B2
(45) Date of Patent: Nov. 17, 2020

(54) BUS BAR MODULE AND POWER SUPPLY DEVICE

(71) Applicant: Yazaki Corporation, Tokyo (JP)

(72) Inventors: Shigeyuki Ogasawara, Kakegawa (JP); Shinichi Yanagihara, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 719 days.

(21) Appl. No.: 14/925,080

(22) Filed: Oct. 28, 2015

(65) Prior Publication Data
US 2016/0049631 A1 Feb. 18, 2016

Related U.S. Application Data

(63) Continuation of application No. PCT/JP2014/062274, filed on May 7, 2014.

(30) Foreign Application Priority Data

May 7, 2013 (JP) .................... 2013-097537

(51) Int. Cl.
*H01M 2/20* (2006.01)
*H01M 10/48* (2006.01)

(52) U.S. Cl.
CPC .......... *H01M 2/206* (2013.01); *H01M 10/482* (2013.01); *H01M 2220/20* (2013.01)

(58) Field of Classification Search
CPC . H01M 10/482; H01M 2220/20; H01M 2/206
See application file for complete search history.

(56) References Cited

U.S. PATENT DOCUMENTS

| | | | | |
|---|---|---|---|---|
| 2011/0064987 A1* | 3/2011 | Ogasawara | ........... | H01M 2/206 429/121 |
| 2012/0183833 A1* | 7/2012 | Ikeda | ........... | H01M 2/1077 429/121 |
| 2012/0231640 A1* | 9/2012 | Ikeda | ........... | H01M 2/1061 439/110 |
| 2013/0010449 A1* | 1/2013 | Ikeda | ........... | H02G 3/0437 361/826 |
| 2013/0071721 A1* | 3/2013 | Ogasawara | ........... | H01M 2/1077 429/151 |

* cited by examiner

*Primary Examiner* — Adam A Arciero
(74) *Attorney, Agent, or Firm* — Locke Lord LLP

(57) ABSTRACT

A bus bar module includes a plurality of bus bars, each of which connects adjacent electrodes in a plurality of batteries so as to connect the plurality of batteries in series, the plurality of batteries being arranged such that the electrodes thereof are aligned in a straight line, a terminal connected to each of the bus bars; and a casing that accommodates the plurality of bus bars and the plurality of terminals. The casing includes a routing groove configured to route an electric wire in the arrangement direction, the electric wire being to be connected to the terminal. The routing groove includes an absorbing portion formed to be swollen such that a groove width dimension of a part thereof is made larger than a groove width dimension of the other part thereof, whereby the absorbing portion absorbs an extra length portion of the electric wire.

2 Claims, 3 Drawing Sheets

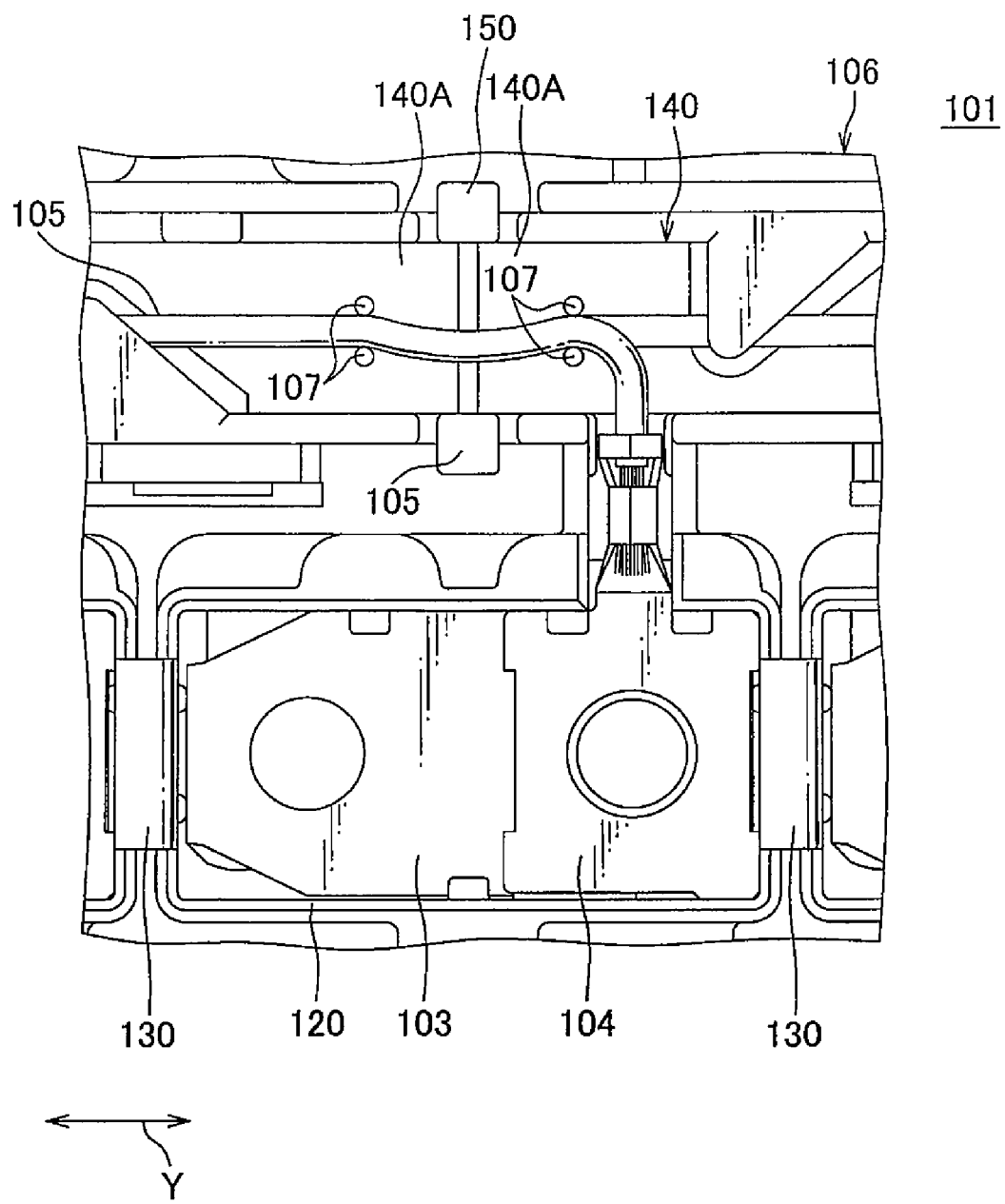

BUS BAR MODULE AND POWER SUPPLY DEVICE

TECHNICAL FIELD

The present invention relates to a bus bar module and a power supply device and, more particularly, to a bus bar module for connecting a plurality of batteries in series and a power supply device having the bus bar module.

BACKGROUND ART

The above power supply device is mounted in, e.g., an electric car that is driven by an electric motor, a hybrid car that is driven by both an engine and an electric motor, or the like, as a drive source for the electric motor. Such a power supply device uses a bus bar module as described in Patent Literature 1.

A bus bar module 101 illustrated in FIG. 3 is attached to a battery assembly (not illustrated) obtained by alternately overlapping, in a reverse direction, batteries each having a positive electrode at one end thereof and a negative electrode at the other end thereof and connects the batteries overlapped with each other in series. The bus bar module 101 includes a plurality of bus bars 103 each connecting electrodes of the adjacent batteries in the battery assembly to thereby connect the plurality of batteries in series, a plurality of terminals 104 each connected to each bus bar 103 and detecting a voltage of the battery, a plurality of electric wires 105 each connected to each terminal 104, and a synthetic resin plate 106 accommodating the bus bars 103, terminals 104, and electric wires 105.

The plate 106 integrally includes a plurality of first accommodating portions 120 each accommodating each bus bar 103 and each terminal 104 connected overlapped to each bus bar 103 and arranged along an overlapping direction of the plurality of batteries (Y arrow direction), a plurality of second accommodating portions 140A aligned in a straight line parallel to an arrangement direction of the plurality of first accommodating portions 120 so as to configure an accommodating groove 140 formed in a gutter-shape that is capable of accommodating the electric wires 105 connected to each terminal 104, a plurality of first pitch adjustment hinges 130 used for changing an interval between the adjacent first accommodating portions 120 so as to adjust a displacement between the bus bar 103 and electrode, a plurality of second pitch adjustment hinges 150 used for changing an interval between adjacent second accommodating portions 140A, and a plurality of pairs of fixing portions 107 disposed in the electric wire accommodating groove 140 along the arrangement direction of the plurality of first accommodating portions 120 and spaced apart from each other such that the second pitch adjustment hinge 150 is positioned therebetween, so as to fix the plurality of electric wires 105.

The thus configured conventional bus bar module 101 uses the pitch adjustment hinges 130 and 150 to absorb an extra length of the electric wire 105. Further, in the bus bar module 101, the electric wire 105 is made to meander in the electric wire accommodating groove 140 and fixed by the fixing portions 107 to thereby absorb the extra length portion of the electric wire 105.

CITATION LIST

Patent Literature

Patent Literature 1: JP 2010-170884A

SUMMARY OF INVENTION

Technical Problem

In recent years, the number of batteries to be connected is increased so as to respond to an increase in vehicle's voltage and, accordingly, a cumulative tolerance (accumulation of tolerance for each battery) tends to increase in the bus bar module 101. To cope with this, the above-mentioned conventional bus bar module 101 is provided with the pitch adjustment hinges 130 and 150 for adjusting the displacement between each bus bar 103 and each electrode so as to previously provide the electric wire 105 connected to the terminal 104 with an extra length, i.e., slack in case the plate 106 is stretched due to generation of the cumulative tolerance in the battery assembly.

Further, when being routed, each electric wire 105 may have waviness caused by being applied with bending deformation. In order to accommodate a plurality of the electric wires 105 arranged in a bundle, each having the waviness, in the electric wire accommodating groove 140, it is necessary to set the entire groove width direction of the electric wire accommodating groove 140 larger.

Further, in the conventional bus bar module 101, the electric wire 105 is made to meander in the electric wire accommodating groove 140 to absorb the extra length portion of the electric wire 105, so that it is necessary to set the entire groove width dimension of the electric wire accommodating groove 140 larger so as to allow the electric wire 105 to meander, or it is necessary to provide the fixing portions 107 for fixing the meandering electric wire 105, resulting in an increase in a size of the electric wire accommodating groove 140 in the groove width direction.

An object of the present invention is to provide a bus bar module and a power supply device capable of absorbing the extra length portion of the electric wire routed in a wire routing groove while downsizing a groove width direction of the wire routing groove.

Solution to Problem

One aspect of the present invention is a bus bar module including: a plurality of bus bars, each of which connects adjacent electrodes in a plurality of batteries so as to connect the plurality of batteries in series, the plurality of batteries being arranged such that the electrodes thereof are aligned in a straight line; a terminal connected to each of the bus bars; and a casing that accommodates the plurality of bus bars and the plurality of terminals, wherein the casing includes a routing groove provided along the arrangement direction of the batteries and configured to route an electric wire in the arrangement direction, the electric wire being to be connected to the terminal, and the routing groove includes an absorbing portion formed to be swollen such that a groove width dimension of a part thereof is made larger than a groove width dimension of the other part thereof, whereby the absorbing portion absorbs an extra length portion of the electric wire.

A first preferred aspect of the present invention is provided such that, in the invention according to the one aspect of the present invention, the bus bar module further includes a plurality of accommodating portions arranged parallel to the routing groove and each configured to accommodate each of the bus bars and each of the terminals, wherein the absorbing portion is formed to be swollen to the accommodating portion side.

A second preferred aspect of the present invention is provided such that, in the invention according to the first preferred aspect of the present invention, the absorbing portion is provided between the routing groove and the accommodating portion, the routing groove includes a locking receiving portion to be engaged with a cover that covers an opening of the routing groove, whereby the locking receiving portion maintains a state where the opening of the routing groove is covered by the cover, and the locking receiving portion is provided at a position aligned with the absorbing portion in the arrangement direction.

An other aspect of the present invention is a power supply device including: a battery assembly including a plurality of batteries in which positive and negative electrodes are alternately and oppositely overlapped with each other; and the bus bar module according to any one of the one aspect to the second preferred aspect of the present invention.

Advantageous Effects of Invention

According to the one aspect to the third preferred aspect of the present invention, the casing includes the routing groove provided along the arrangement direction of the batteries and configured to route the electric wire to be connected to the terminal in the arrangement direction, and the routing groove includes the absorbing portion formed to be swollen such that a part of a groove width thereof is made larger than a groove width dimension of the other part thereof, thereby the absorbing portion absorbs an extra length portion of the electric wire. Thus, a place in which the extra length portion of the electric wire is accommodated is specified, thereby eliminating the need to take measures that have conventionally been adopted, i.e., to set the entire groove width dimension of the electric wire accommodating groove so as to allow the electric wire to meander or to provide the fixing portion for fixing the meandering electric wire. This makes it possible to absorb the extra length portion routed in the routing groove while downsizing the size of the bus bar module.

According to the first preferred aspect of the present invention, the bus bar module includes the accommodating portions arranged parallel to the routing groove and each configured to accommodate each bus bar and each terminal. The absorbing portion is formed to be swollen to the accommodating portion side. This eliminates the absorbing portion from being swollen in a direction separated from the accommodating portion of the routing groove. Thus, it is possible to absorb the extra length portion routed in the routing groove while further downsizing the size of the bus bar module.

According to the second preferred aspect of the present invention, the absorbing portion is provided between the routing groove and accommodating portion. The routing groove includes the locking receiving portion to be engaged with the cover that covers the opening of the routing groove so as to maintain a state where the opening of the routing groove is covered by the cover. The locking receiving portion is provided at a position parallel to the absorbing portion in the arrangement direction. Thus, it is possible to enable a structure capable of maintaining a state where the opening of the routing groove is covered while downsizing the size of the bus bar module.

BRIEF DESCRIPTION OF DRAWINGS

FIG. 3 is a plan view illustrating a conventional bus bar module.

DESCRIPTION OF EMBODIMENTS

Hereinafter, a bus bar module and a power supply device according to an embodiment of the present invention will be described with reference to FIG. 1 and FIGS. 2A and 2B.

Figure 1:
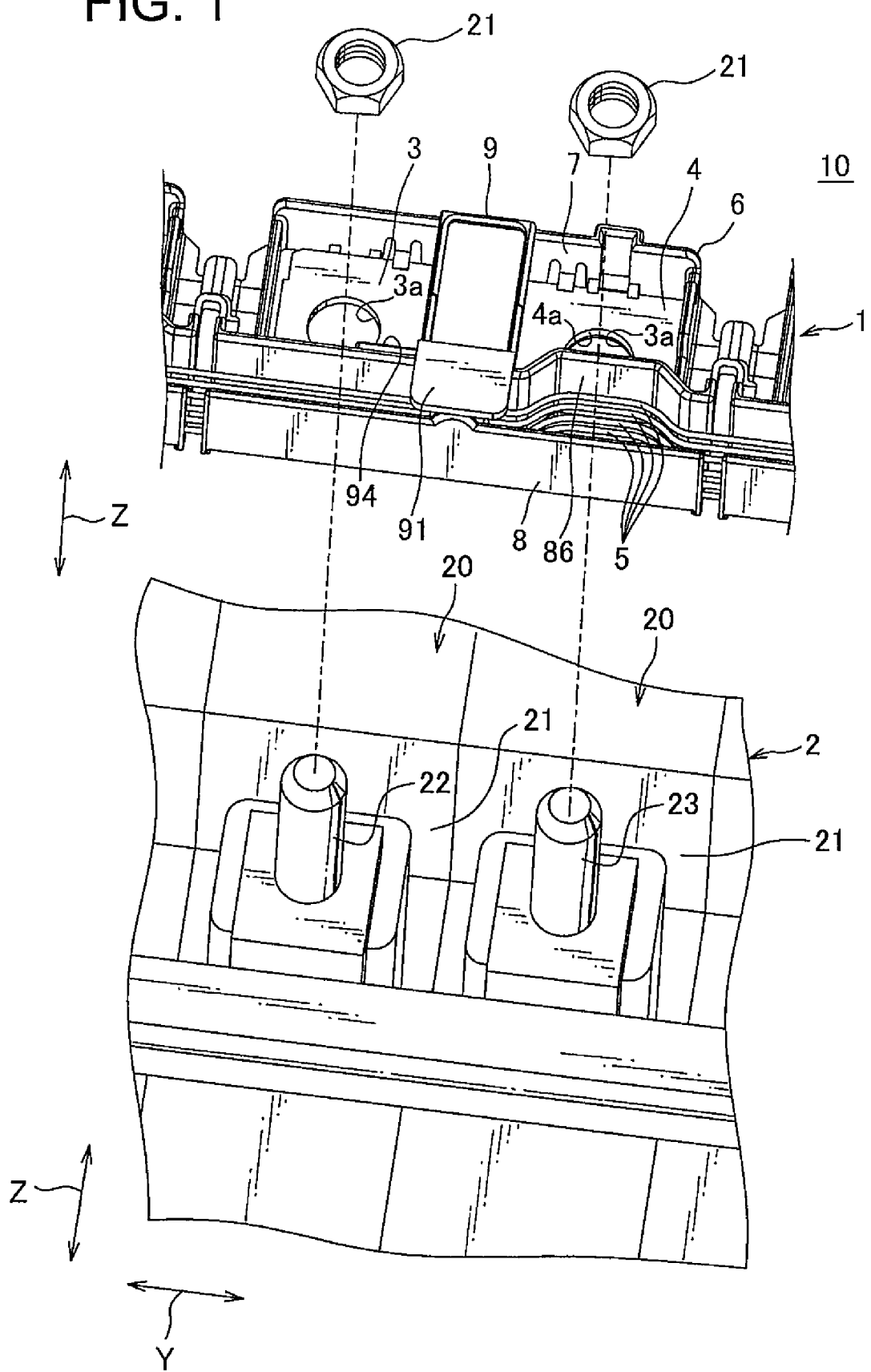
FIG. 1 is an exploded perspective view of a power supply device according to an embodiment of the present invention.

As illustrated in FIG. 1, a bus bar module 1 is attached to a top surface of a battery assembly 2 illustrated in FIG. 1 to constitute a power supply device 10. The power supply device 10 is mounted in an electric car that runs using an electric motor, a hybrid car that runs using both an engine and an electric motor, or the like, and supplies power to the electric motor.

As illustrated in FIG. 1, the battery assembly 2 includes a plurality of batteries 20 and a fixing member (not illustrated) for fixing the plurality of batteries 20 in an overlapping manner. Each battery 20 includes a battery body 21 having a box-like casing filled with electrolyte, a positive electrode 22 (an example of "electrodes"), and a negative electrode 23 (an example of "electrodes"). The positive and negative electrodes 22 and 23 protrude from one and the other surfaces of the battery body 21, respectively. The positive and negative electrodes 22 and 23 are each formed into a columnar shape using a conductive metal and each have a screw groove to be engaged with a nut 2A on an outer peripheral surface thereof.

In the plurality of batteries 20, the electrodes are arranged in two rows. In each row, the positive and negative electrodes 22 and 23 are alternately arranged in a straight line along an overlapping direction of the batteries 20. An arrow Y in FIG. 1 indicates an arrangement direction of the plurality of batteries 20 and a longitudinal direction of the bus bar module 1, an arrow X indicates a width direction of the bus bar module 1 and a groove width direction of a routing groove 8 that will be described later, and an arrow Z indicates a height direction of the bus bar module 1. Further, in the present specification, the height direction of the bus bar module 1 is sometimes referred to as an up-down direction.

The bus bar module 1 connects the above-mentioned plurality of batteries 20 in series. As illustrated in FIG. 1, the bus bar module 1 includes a plurality of bus bars 3 each connecting the positive and negative electrodes 22 and 23 of adjacent batteries 20 so as to connect the plurality of batteries 20 in series, a plurality of voltage detection terminals 4 (an example of "terminals") each electrically connected to each bus bar 3 to detect a voltage of each battery 20, a plurality of voltage detection lines 5 (an example of "electric wires") connected to each voltage detection terminal 4, and a casing 6 that accommodates the plurality of bus bars 3, the plurality of voltage detection terminals 4, and the plurality of voltage detection lines 5. In the bus bar module 1, the electric motor is connected to different polarity electrodes positioned at both ends of the plurality of batteries 20 to supply power to the electric motor.

The plurality of bus bars 3 are each obtained by pressing a metal plate. As illustrated in FIG. 1, each bus bar 3 has a configuration in which a pair of through holes 3a through which the positive and negative electrodes 22 and 23 of the adjacent electrodes are inserted are formed in a rectangular metal plate. The positive and negative electrodes 22 and 23 inserted through the pair of through holes 3a are screwed with the nuts 2A, respectively, whereby the bus bar 3 is fixed and electrically connected to the positive and negative electrodes 22 and 23.

The plurality of voltage detection terminals 4 are each obtained by pressing process on a metal plate or the like. As illustrated in FIG. 1, each voltage detection terminal 4 includes a terminal body 41 formed in rectangular plate-like shape and an electric wire connection portion that is not illustrated, continuously formed from the terminal body 41 and connecting the terminal body 41 and the voltage detection line 5. The terminal body 41 is provided with, at its center, a through hole 4a. The voltage detection terminal 4 is overlapped on each bus bar 3 to be electrically connected thereto with one of the positive and negative electrodes 22 and 23 of the battery 20 inserted through the through hole 4a and is electrically connected to the voltage detection line 5 at its electric wire connection portion.

The casing 6 is formed into a substantially rectangular shape substantially the same as that of the top surface of the battery assembly 2 and is overlapped on the top surface of the battery assembly 2. As illustrated in FIGS. 2A and 2B, the casing 6 includes a plurality of bus bar accommodating portions 7 (an example of "accommodating portions") each formed into a box shape capable of accommodating each bus bar 3 and each voltage detection terminal 4 overlapped on the bus bar 3 and connected to each other in a straight line along the Y arrow direction, the routing groove 8 formed in a gutter-shape provided in a straight line parallel to an arrangement direction of the plurality of bus bar accommodating portions 7 and routing the voltage detection line 5 connected to the voltage detection terminal 4 in the Y arrow direction, and a turning portion 9 connected to an opening edge of each bus bar accommodating portion 7 through a hinge 90 so as to be freely turnable between a cover position covering a part of an opening of the routing groove 8 and an exposure position exposing the entire opening of the routing groove 8.

The plurality of bus bar accommodating portions 7 each includes a peripheral wall 7A surrounding the bus bar 3 and a base wall 7B continuously formed from one end thereof to the other end in the X arrow direction at a center portion of the peripheral wall 7A in the Y arrow direction, on a surface of which the bus bar 3 is placed. Further, in the bus bar accommodating portion 7, both sides of the base wall 7B in the Y arrow direction are opened for an insertion of the electrodes 22 and 23 of the batteries 20.

The peripheral wall 7A includes a pair of side walls 70 and 71 extending opposite to a longitudinal direction (Y arrow direction) of the bus bar module and continued to the routing groove 8 and a continuous wall 72 continued to the pair of side walls 70 and 71. The continuous wall 72 includes, on an inner surface thereof, a locking pawl 73A for locking the bus bar 3 placed on the base wall 7B and a locking pawl 73B for locking the voltage detection terminal 4 overlapped on the bus bar 3 placed on the base wall 7B. The locking pawl 73A is provided on one side of the bus bar accommodating portion 7 in the Y arrow direction, and the locking pawl 73B is provided on the other side of the locking pawl 73A in the Y arrow direction.

Figure 2A:
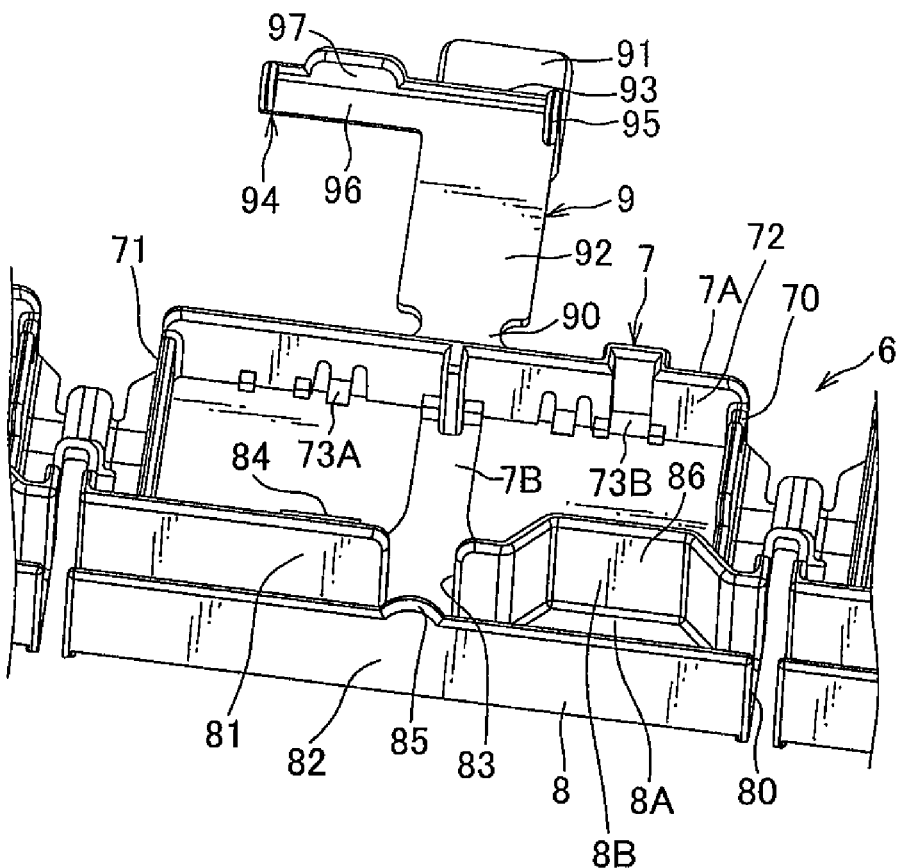
FIG. 2A is a perspective view illustrating an assembly work of a bus bar module constituting the power supply device.
Figure 2B:
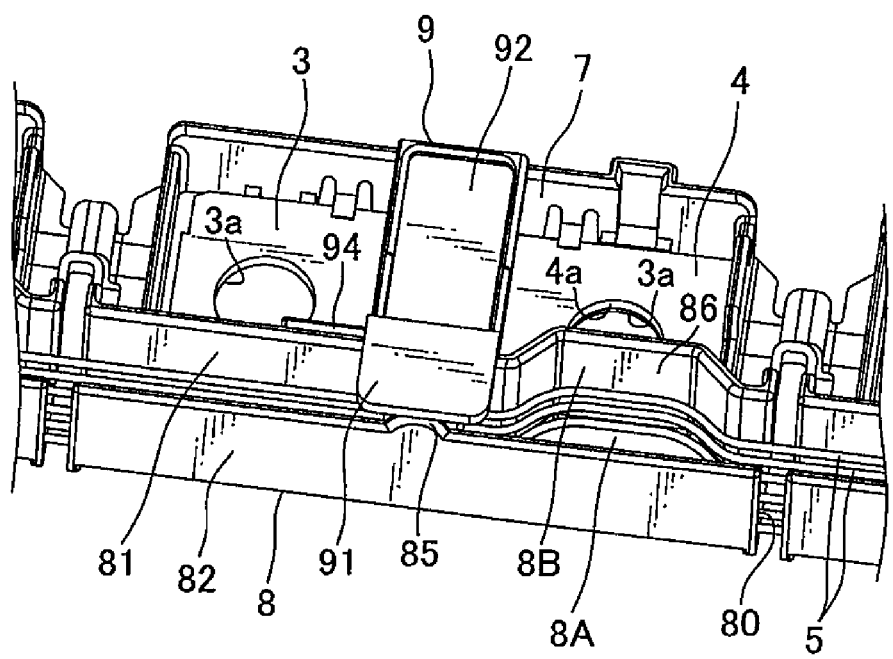
FIG. 2B is a perspective view illustrating an assembly work of a bus bar module constituting the power supply device.

As illustrated in FIGS. 2A and 2B, the routing groove 8 includes a bottom wall 80 formed continuously on the same plane as the base wall 7B of the bus bar accommodating portion 7, on a surface of which the voltage detection line 5 is placed and a pair of standing walls 81 and 82 erected from both edges of the bottom wall 80 in a groove width direction (X arrow direction) thereof. The pair of standing walls 81 and 82 each has a larger dimension in height than the peripheral wall 7A. That is, the pair of standing walls 81 and 82 (routing groove 8) each have its top portion positioned higher than a top portion of the peripheral wall 7A (bus bar accommodating portion 7).

The standing wall 81, which is one of the pair of standing walls 81 and 82, that is provided closer to the bus bar accommodating portion 7 in a groove width direction (X arrow direction) of the bus bar module, includes an introduction port 83 for introducing the voltage detection line 5 led from the bus bar accommodating portion 7 to an inner side of the routing groove 8. The introduction port 83 is provided at an extended position from the hinge 90 in the X arrow direction. The standing wall 81 further includes, at a position adjacent to one side of the introduction port 83 in the Y arrow direction, a cover lock receiving portion 84 (an example of "locking receiving portions") to be engaged with a cover lock portion 94 of the turning portion 9 that will be described later. Thereby, the cover lock receiving portion 84 maintains a position of a cover 91 of the turning portion 9 at the cover position where the cover 91 covers the opening of the routing groove 8.

As illustrated in FIG. 2A, the cover lock receiving portion 84 is provided at a position spaced apart downward from an upper end of an outer surface of the standing wall 81. The cover lock receiving portion 84 is formed in a frame shape extending in the up-down direction (Z arrow direction). Thereby, the cover lock portion 94 of the turning portion 9 is configured to lock a wall portion located at the standing wall 81 side in the X arrow direction, of wall portions constituting the frame-shaped cover lock receiving portion 84.

Further, as illustrated in FIGS. 2A and 2B, the routing groove 8 includes, at a position adjacent to the other side of the introduction port 83 in the Y arrow direction, an extra length accommodating portion 86 (an example of "absorbing portions") that accommodates an extra length portion of the voltage detection line 5 (electric wire). The extra length accommodating portion 86 includes an extended portion 8A obtained by extending a part of an outer edge of the bottom wall 80 of the routing groove 8 to the bus bar accommodating portion 7 side and a swollen wall 8B obtained by swelling a part of the standing wall 81 and continued to an outer edge of the extended portion 8A. The extended portion 8A is formed into a trapezoidal shape having a side parallel to the Y arrow direction outer edge of the bottom wall 80.

The standing wall 82 includes a protruding portion 85 that protrudes upward toward the cover 91 from the routing groove 8. The protruding portion 85 is provided at an extended position from the introduction port 83 of the routing groove 8 in the X arrow direction.

As illustrated in FIGS. 2A and 2B, the turning portion 9 is connected to the bus bar accommodating portion 7 so as to be freely turnable in the Y arrow direction by 180 degrees. The turning portion 9 includes the cover 91 covering a part of the opening of the routing groove 8, a parallel portion 92 extending continuously to the hinge 90 in parallel to the cover 91, a raised portion 93 raised toward the cover 91 from the parallel portion 92, and the cover lock portion 94 continued from the parallel portion 92. The cover 91, parallel portion 92, and raised portion 93 are aligned in a straight line along the X arrow direction so as to cover the opening of the introduction port 83. The cover lock portion 94 is provided on one side of the cover 91, parallel portion 92, and raised portion 93 in the Y arrow direction. The cover 91, parallel portion 92, and raised portion 93 each have a slightly larger dimension in the Y arrow direction than the introduction port 83 and a smaller dimension than a dimension between the pair of through holes 3a of the bus bar 3 (dimension between the electrodes 22 and 23 of the batteries 20).

The hinge 90 is integrally formed with the continuous wall 72 of the bus bar accommodating portion 7 and parallel portion 92 between the continuous wall 72 and parallel portion 92. The hinge 90 is formed to have a smaller groove width and thickness than the parallel portion 92 so as to obtain an easy-bendable property.

The cover 91 is formed into a rectangular plate shape and has a larger dimension in the X arrow direction than the routing groove 8 (dimension of the other part of the routing groove).

The parallel portion 92 is formed into a rectangular plate shape and has substantially the same dimension in the X arrow direction as that of the bus bar accommodating portion 7 in the X arrow direction. The parallel portion 92 includes, on one side in the Y arrow direction, the cover lock portion 94, and includes, on the other side in the Y arrow direction, a regulation piece 95 regulating movement of the voltage detection line 5 connected to the voltage detection terminal 4.

The cover lock portion 94 includes an extension portion 96 extending from a Y arrow direction one end portion of an end portion of the parallel portion 92 on the raised portion 93 side (X arrow direction side) toward one side in the Y arrow direction, a plate-like shaped insertion portion 97 protruding from the extension portion 96 toward an inside of the cover lock receiving portion 84 of the bus bar accommodating portion 7 in a state where the cover 91 covers the opening of the routing groove 8 to be inserted into the cover lock receiving portion 84, and a pawl portion (not illustrated) protruding from the insertion portion 97 to be engaged with the cover lock receiving portion 84.

The regulation piece 95 is provided at a Y arrow direction the other end portion of the end portion of the parallel portion 92 on the raised portion 93 side (X arrow direction side) so as to protrude from the parallel portion 92 to the base wall 7B of the bus bar accommodating portion 7 and abut against the base wall 7B. Further, the regulation piece 95 abuts against an opening edge of the introduction port 83 on the other side in the Y arrow direction in the state where the cover 91 covers the opening of the routing groove 8.

The raised portion 93 is formed such that a longitudinal dimension thereof from the cover 91 to parallel portion 92 is substantially equal to a dimension obtained by adding the maximum protruding dimension (dimension in the Z arrow direction) of the protruding portion 85 to a dimensional difference between the top portion of the routing groove 8 and top portion of the bus bar accommodating portion 7.

The following describes an assembly procedure of the power supply device 10 having the above configuration with reference to FIGS. 2A and 2B. The bus bars 3, the voltage detection terminals 4, the casing 6, and the like are previously produced individually. Then, each bus bar 3 is pushed to each bus bar accommodating portion 7 of the casing 6 and locked by the locking pawl 73A. Further, the voltage detection terminal 4 is pushed to the bus bar accommodating portion 7 so as to be overlapped on the bus bar 3 and locked by the locking pawl 73B. The opening on the base wall 7B side provided in the bus bar accommodating portion 7 and the pair of through holes 3a provided in the bus bar 3 are overlapped with each other, and the through hole 4a formed in the voltage detection terminal 4 is overlapped on the bus bar accommodating portion 7 and one of the pair of through holes 3a of the bus bar 3. Further, one end portion of each voltage detection line 5 is connected to each voltage detection terminal 4. The other end side of each voltage detection line 5 is inserted into the introduction port 83 and routed in the routing groove 8.

The voltage detection line 5 is long enough to be connected to the voltage detection terminal 4 and a voltage detection circuit which are positioned in the casing 6 designed so as to correspond to the battery assembly 2 formed with the maximum dimension within a tolerance range. However, for example, when the bus bar module 1 is connected to the battery assembly 2 formed with the minimum dimension within a tolerance range, an extra length portion may be generated in the voltage detection line 5. To cope with this, the extra length accommodating portion 86 is provided in the bus bar module 1 according to the present invention, so that it is possible to absorb the extra length portion by accommodating the extra length portion of the voltage detection line 5 in the extra length accommodating portion 86.

Subsequently, the turning portion 9 located at an opening position illustrated in FIG. 2A is turned by 180 degrees to a closing position illustrated in FIG. 2B. Then, the regulation piece 95 abuts against the base wall 7B of the bus bar accommodating portion 7. Further, the cover lock portion 94 enters inside the cover lock receiving portion 84, and the pawl portion thereof is locked at the lower end of the cover lock receiving portion 84. Further, the cover 91 is brought into contact with the top portion of the protruding portion 85 to cover a part of the opening of the routing groove 8. In this manner, assembly of the bus bar module 1 is made up.

The bus bar module 1 assembled in the above procedure is overlapped on the top surface of the battery assembly 2 with the positive and negative electrodes 22 and 23 inserted through the opening of the casing 6 on the base wall 7B side, through holes 3a of the bus bar 3, and the through hole 4a of the voltage detection terminal 4. The thus inserted positive and negative electrodes 22 and 23 are screwed with the nuts, respectively. As a result, the electrodes 22 and 23 of the batteries 20, the bus bar 3 and the voltage detection line 5 are electrically connected to each other, whereby assembly of the power supply device 10 is made up.

According to the above-described embodiment, the bus bar module 1 is provided with the extra length accommodating portion 86. Thereby, the extra length portion of the voltage detection line 5 is not absorbed by being accommodated over the entire area of the routing groove 8, but a place where the extra length portion of the voltage detection line 5 is accommodated becomes to be specified. Thus, it is possible to absorb the extra length portion of the voltage detection line 5 routed in the routing groove 8 of the bus bar module 1 while downsizing the groove width direction (X arrow direction) of the routing groove 8.

While the present invention has been described with a preferred embodiment, it is to be understood that the present invention is not limited to the configuration described in the above embodiment. In the above embodiment, the extra length accommodating portion 86 of the routing groove 8 is formed so as to be swollen only to the bus bar accommodating portion 7; however, the present invention is not limited thereto. The extra length accommodating portion 86 may be formed so as to be swollen only from the routing groove 8 to a side opposite to the bus bar accommodating portion 7, or may be formed so as to be swollen both from the routing groove 8 to the bus bar accommodating portion 7 side and the side opposite to the bus bar accommodating portion 7.

The above embodiments are shown as representative embodiments, and the present invention is not limited thereto. That is, those skilled in the art are capable of making various modifications according to conventional known knowledge without departing from the scope of the present invention. The modifications are included in the category of the present invention insofar as the configuration of the bus bar module 1 is enabled in the modifications.

REFERENCE SIGNS LIST

1 Bus bar module
10 Power supply device
2 Battery assembly
3 Bus bar
4 Voltage detection terminal (an example of "terminals")
5 Voltage detection line (an example of "electric wires")
6 Casing
8 routing groove
86 Extra length accommodating portion (an example of "absorbing portions")
Y Arrangement direction

The invention claimed is:

1. A bus bar module comprising:

a plurality of bus bars, each of which connects adjacent electrodes in a plurality of batteries so as to connect the plurality of batteries in series, the plurality of batteries being arranged such that the electrodes thereof are aligned in a straight line;

a plurality of terminals connected to the plurality of bus bars, respectively; and a casing that accommodates the plurality of bus bars and the plurality of terminals, wherein the casing includes a routing groove provided along the arrangement direction of the batteries and configured to route an electric wire in the arrangement direction, the electric wire being to be connected to the terminal, the routing groove includes an absorbing portion, directly adjacent one of the plurality of terminals, formed to be swollen such that a groove width dimension of a part of the routing groove where the absorbing portion is formed is larger than a groove width dimension of a rest of the routing groove, whereby the absorbing portion absorbs an extra length portion of the electric wire, the routing groove includes a bottom wall on which the electric wire is placed and a pair of standing walls erected from both edges in a groove width direction of the bottom wall, the bottom wall includes an extended portion that is projected in the groove width direction with respect to a rest of the bottom wall, and a width of the bottom wall in the groove width direction is larger at the extended portion than at the rest of the bottom wall, the absorbing portion is constituted of the extended portion and a swollen wall formed by swelling a part of one of the standing walls to an outer edge of the extended portion, at the absorbing portion, entire of the routing groove is provided with the bottom wall, the casing includes:

a plurality of accommodating portions arranged parallel to the routing groove and each configured to accommodate each of the bus bars and each of the terminals, a cover that covers an opening of the routing groove, and a locking receiving portion to be engaged with the cover, whereby the locking receiving portion maintains a state where the opening of the routing groove is covered by the cover, the absorbing portion is formed to be swollen to the accommodating portion side, directly adjacent one of the plurality of terminals such that the groove width dimension of the part of the routing groove where the absorbing portion is formed is larger than the groove width dimension of the rest of the routing groove, whereby a width of the accommodating portion, in the same direction as the groove width direction, where the absorbing portion is formed is smaller than a width of the accommodating portion where no absorbing portion is formed, and the locking receiving portion is provided on a surface of the one of the pair of standing walls partitioning the routing groove and the accommodating portion, the surface facing the accommodating portion side, and the locking receiving portion is provided at a position aligned with the absorbing portion in the arrangement direction.

2. A power supply device comprising:

a battery assembly including a plurality of batteries in which positive and negative electrodes are alternately and oppositely overlapped with each other; and the bus bar module according to claim 1.

* * * * *